(12) United States Patent
Army et al.

(10) Patent No.: US 11,130,581 B2
(45) Date of Patent: Sep. 28, 2021

(54) AIR NOZZLE ARRANGEMENT

(71) Applicant: Hamilton Sundstrand Corporation, Charlotte, NC (US)

(72) Inventors: Donald E. Army, Enfield, CT (US); Thomas M. Zywiak, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 152 days.

(21) Appl. No.: 16/014,682

(22) Filed: Jun. 21, 2018

(65) Prior Publication Data

US 2019/0389585 A1    Dec. 26, 2019

(51) Int. Cl.
| | | |
|---|---|---|
| B64D 13/08 | (2006.01) | |
| F02C 6/08 | (2006.01) | |
| F02C 7/141 | (2006.01) | |
| B64D 13/06 | (2006.01) | |

(52) U.S. Cl.
CPC ............ B64D 13/08 (2013.01); F02C 6/08 (2013.01); F02C 7/141 (2013.01); *B64D 2013/0618* (2013.01)

(58) Field of Classification Search
CPC ..................................................... B64D 13/08
USPC ................................................................ 454/76
See application file for complete search history.

(56) References Cited

U.S. PATENT DOCUMENTS

| | | | | |
|---|---|---|---|---|
| 2,817,959 | A * | 12/1957 | Lustwerk ............ | F28D 5/02 62/91 |
| 3,752,422 | A * | 8/1973 | Runnels ............... | B64D 13/00 244/118.5 |
| 7,188,488 | B2 | 3/2007 | Army et al. | |
| 9,656,756 | B2 | 5/2017 | Atkey | |
| 2001/0045674 | A1 * | 11/2001 | Herr ..................... | D21F 7/008 261/118 |
| 2002/0162345 | A1 * | 11/2002 | Laugt .................. | B64D 13/02 62/239 |
| 2011/0259546 | A1 * | 10/2011 | DeFrancesco ...... | B64D 13/00 165/42 |
| 2014/0097268 | A1 * | 4/2014 | Lah ..................... | C10B 55/00 239/115 |
| 2015/0041108 | A1 | 2/2015 | Gold | |
| 2015/0251761 | A1 | 9/2015 | Vandyke et al. | |
| 2017/0341757 | A1 | 11/2017 | Weber et al. | |
| 2017/0341758 | A1 | 11/2017 | Bruno et al. | |
| 2018/0058317 | A1 | 3/2018 | Shaffer et al. | |
| 2018/0111693 | A1 | 4/2018 | Shea | |

FOREIGN PATENT DOCUMENTS

| | | |
|---|---|---|
| EP | 0528894 A1 | 3/1993 |
| EP | 2868579 A1 | 5/2015 |
| WO | 20130166077 A1 | 11/2013 |

OTHER PUBLICATIONS

Search Report dated Oct. 31, 2019 in U311154EP, 8 pages.
European Serch Report Application No. EP19179926.1; dated Nov. 19, 2020; pp. 5.

* cited by examiner

*Primary Examiner* — Vivek K Shirsat
(74) *Attorney, Agent, or Firm* — Cantor Colburn LLP

(57) ABSTRACT

A RAM inlet header (RIH) is provided and includes a body through which RAM air flows from an inlet toward a heat exchanger and a nozzle body arranged along a wall of the body to direct a curtain of cooled air into flows of the RAM air and toward the heat exchanger.

18 Claims, 7 Drawing Sheets

FIG. 11A
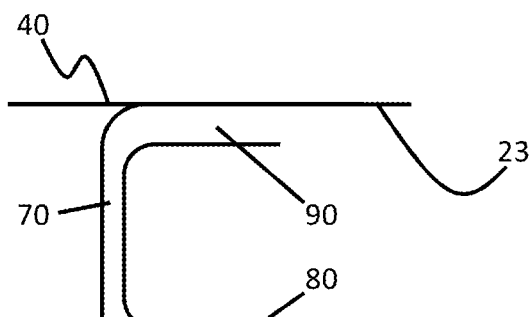
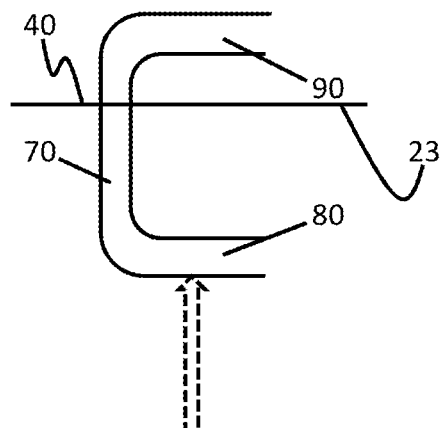
FIG. 11B
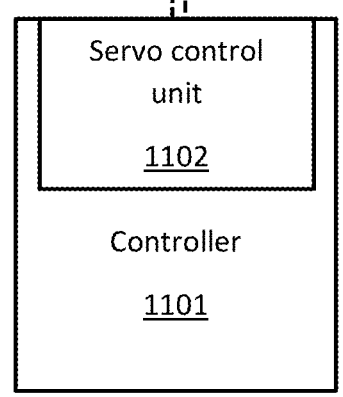
FIG. 12A
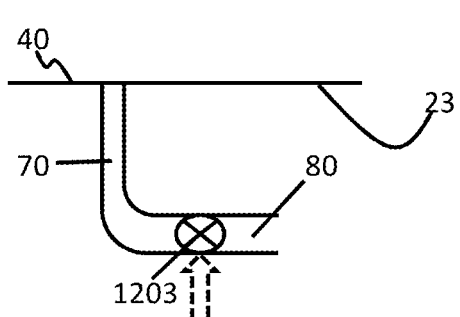
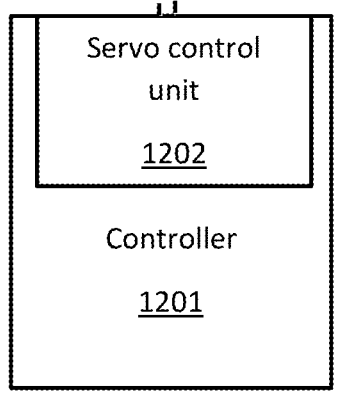
FIG. 12B
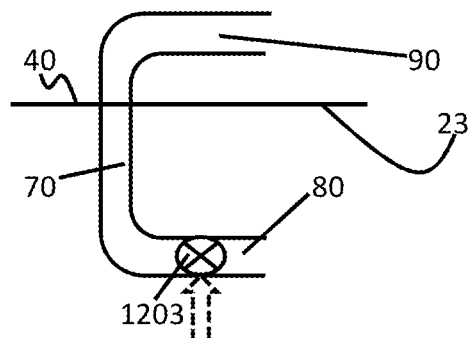
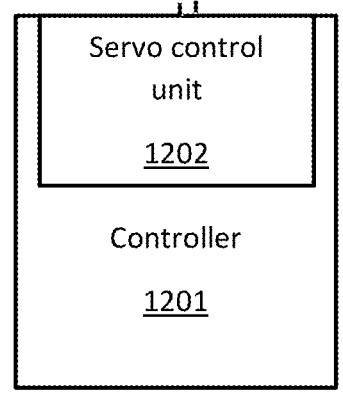

AIR NOZZLE ARRANGEMENT

BACKGROUND

The following description relates to air nozzle arrangements and, more specifically, to multiple air nozzle arrangements and to slotted air nozzle arrangements for use with environmental control systems (ECSs).

In aircraft, RAM air is often used to exchange heat with fluids used by various systems, such an ECS. In some cases, for example, RAM air enters the RAM air circuit at an inlet and is sprayed with water for cooling purposes. The cooled RAM continues through the RAM air circuit and comes into contact with a chiller heat exchanger, a fresh air heat exchanger and finally a bleed air heat exchanger before being output overboard through an outlet of the RAM air circuit. While this configuration provides for cooling effects, the cooling effects are often limited by the incoming temperature of the RAM air especially on hot days.

Therefore, it has been proposed to direct cool air into the RAM air circuit at a location defined upstream from the chiller heat exchanger in order to achieve improved cooling effects. The cool air can be drawn from a supply of excess pack turbine cooled air produced by fresh and power turbines. As the excess pack turbine cooled air is often cooler than the RAM air entering the inlet of the RAM air inlet (e.g., the excess pack turbine cooled air may be 70° F. versus 90° F. for the RAM air on especially warm days) the improved cooling effects can be substantial.

BRIEF DESCRIPTION

According to an aspect of the present disclosure, a RAM inlet header (RIH) is provided and includes a body through which RAM air flows from an inlet toward a heat exchanger and a nozzle body arranged along a wall of the body to direct a curtain of cooled air into flows of the RAM air and toward the heat exchanger.

In accordance with additional or alternative embodiments, the body has a curvature parallel to a plane of the wall.

In accordance with additional or alternative embodiments, the nozzle body is proximate to a cold-cold corner of the heat exchanger.

In accordance with additional or alternative embodiments, the curtain is formed along a plane of the wall.

In accordance with additional or alternative embodiments, the nozzle body includes at least one of metallic, molded and composite materials.

In accordance with additional or alternative embodiments, the nozzle body is electro-magnetically, hydraulically or pneumatically extendable and retractable.

According to an aspect of the present disclosure, a RAM inlet header (RIH) is provided and includes a body through which RAM air flows from an inlet toward a heat exchanger and a plurality of nozzles arranged along a wall of the body to direct cooled air into flows of the RAM air and toward the heat exchanger. Each nozzle is displaced from a neighboring nozzle and includes a first body, which is formed to define a first flowpath and which is extendable in a first direction from the wall of the body, a second body, which is formed to define a second flowpath and which is extendable in a second direction along a plane of the wall of the body and a curved body interposed between the first and second bodies and by which the second flowpath is receptive of fluid from the first flowpath.

In accordance with additional or alternative embodiments, the body has a curvature parallel to a plane of the wall, the wall is formed to define holes and the RIH further includes a manifold disposed at an exterior of the body and configured to distribute the cooled air to each nozzle via the holes and a tubular body to transport the cooled air to an intake of the manifold.

In accordance with additional or alternative embodiments, a predominant flow direction of the cooled air leaving the second body of each nozzle opposes a predominant flow direction of the cooled air in the tubular body.

In accordance with additional or alternative embodiments, each of the nozzles has a substantially uniform shape and size.

In accordance with additional or alternative embodiments, the plurality of nozzles is arranged in a linear formation with substantially uniform spacing along the wall.

In accordance with additional or alternative embodiments, a height of each of the nozzles is substantially less than a distance between the wall and an opposite wall of the body.

In accordance with additional or alternative embodiments, a height of each of the nozzles as measured from the wall is variable.

In accordance with additional or alternative embodiments, each nozzle is electro-magnetically, hydraulically or pneumatically extendable and retractable.

According to an aspect of the present disclosure, a RAM inlet header (RIH) is provided and includes a body through which RAM air flows from an inlet toward a heat exchanger and one or more nozzles arranged along a wall of the body to direct cooled air into flows of the RAM air and toward the heat exchanger. The one or more nozzles are displaced from one or more neighboring nozzles and respectively include a first body, which is formed to define a first flowpath and which is extendable in a first direction from the wall of the body, a second body, which is formed to define a second flowpath and which is extendable in a second direction along a plane of the wall of the body and a curved body interposed between the first and second bodies and by which the second flowpath is receptive of fluid from the first flowpath.

In accordance with additional or alternative embodiments, the body has a curvature parallel to a plane of the wall, the wall is formed to define one or more holes and the RIH further includes a manifold disposed at an exterior of the body and configured to distribute the cooled air to each of the one or more nozzles via the one or more holes and a tubular body to transport the cooled air to an intake of the manifold.

In accordance with additional or alternative embodiments, a predominant flow direction of the cooled air leaving the second body of each of the one or more nozzles opposes a predominant flow direction of the cooled air in the tubular body.

In accordance with additional or alternative embodiments, a height of each of the one or more nozzles is substantially less than a distance between the wall and an opposite wall of the body.

In accordance with additional or alternative embodiments, a height of each of the one or more nozzles as measured from the wall is variable.

In accordance with additional or alternative embodiments, each of the one or more nozzles is electro-magnetically, hydraulically or pneumatically extendable and retractable.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 11A is a side view of an electro-magnetic or hydraulic control of the slotted air nozzle of FIGS. 3, 9 and 10;

FIG. 11B is a side view of the electro-magnetic or hydraulic control of the slotted air nozzle of FIGS. 3, 9 and 10;

FIG. 12A is a side view of a hydraulic or pneumatic control of the slotted air nozzle of FIGS. 3, 9 and 10;

FIG. 12B is a side view of the hydraulic or pneumatic control of the slotted air nozzle of FIGS. 3, 9 and 10;

These and other advantages and features will become more apparent from the following description taken in conjunction with the drawings.

DETAILED DESCRIPTION

As will be described below, air exhaust nozzle features are provided to a RAM inlet header (RIH). In some cases, multiple turbine air exhaust nozzles are added to the RIH. These nozzles direct excess pack turbine cooled air towards the RAM heat exchanger cold-cold corner in order to achieve additional system performance during certain operating modes. The nozzle quantities, positions and sizes are optimized to maximize system performance in terms of cooling and water removal. A distance from outlets of the nozzles is provided to allow cooling flows to distribute along the heat exchanger cold-cold corner. The nozzles are configured to avoid obstructing internal header flows and spaces between the nozzles minimize risk of obstructing flows to the cold-cold corner of the heat exchanger. In other cases, a slotted turbine air exhaust nozzle is added to the RIH. The slotted air nozzle directs excess pack turbine cooled air towards the RAM heat exchanger cold-cold corner in order to achieve additional system performance during certain operating modes. The slotted air nozzle provides a curtain of air directed towards the cold-cold corner of the heat exchanger. The slotted air nozzle is positioned and sized to be optimized to maximize system performance in terms of cooling and water removal. The slot height can be varied to enhance flow distribution and a distance from the slotted air nozzle outlet may be provided to distribute cooled air along the heat exchanger cold-cold corner without obstructing internal header flows.

Figure 1:
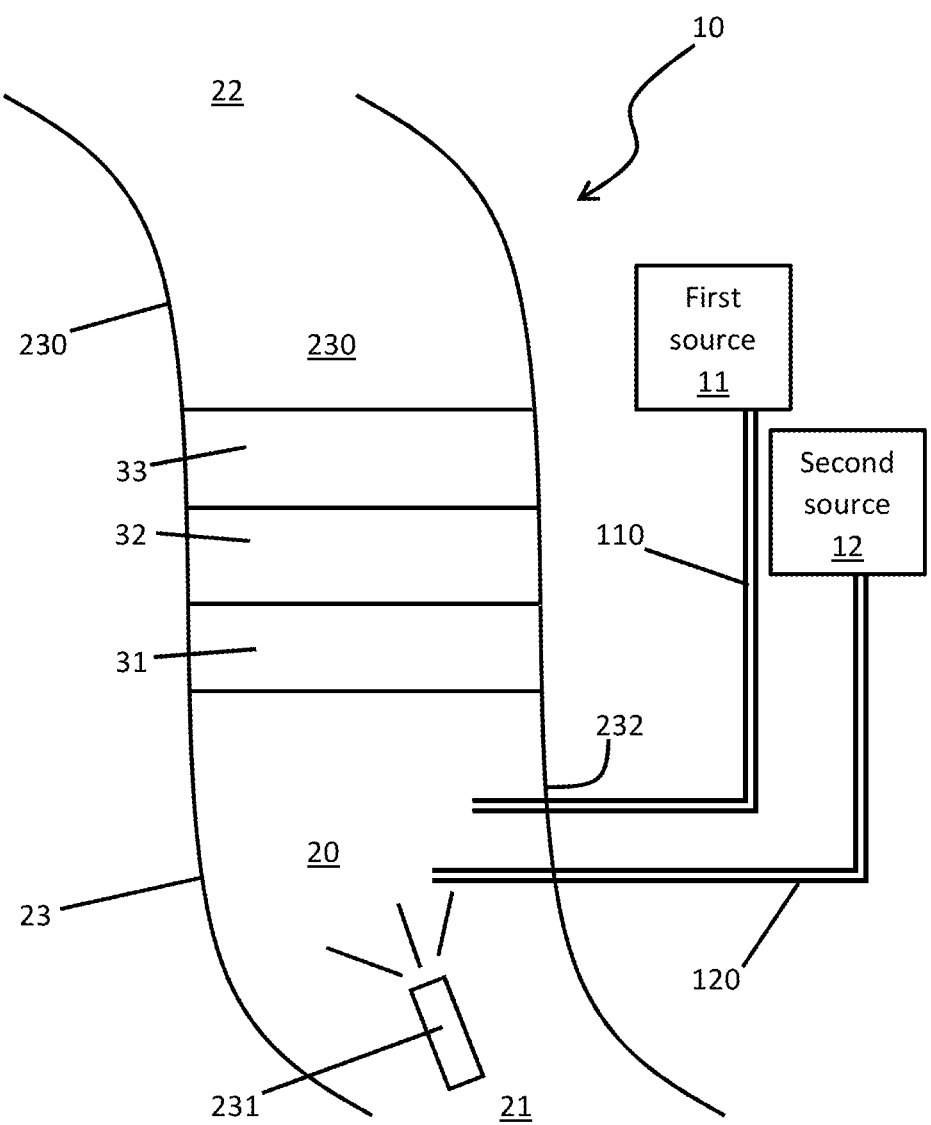
FIG. 1 is a schematic diagram of an environmental control system (ECS) of an aircraft in accordance with embodiments.

With reference to FIG. 1, an environmental control system (ECS) 10 of an aircraft is provided and includes at least one of first and second sources 11 and 12 of excess cooled air and an RIH 20. The first source 11 may be provided, for example, as a fresh air turbine and the second source 12 may be provided, for example, as a power turbine. In any case, the first source 11 is coupled to a first passageway 110 through which excess cooled air is transported from the first source 11 to the RIH 20 and the second source 12 is coupled to a second passageway 120 through which excess cooled air is transported from the second source 12 to the RIH 20.

The RIH 20 includes an inlet 21, an outlet 22 and a body 23, which is formed to define a passage 230 from the inlet 21 to the outlet 22. RAM air can be drawn into the inlet 21 during flight operations and is then directed through the body 23 toward the outlet 22. Within the body 23, the RAM air thermally interacts with coolant, which is sprayed into the RAM air by one or more spray nozzles 231, and first, second and third heat exchangers 31, 32 and 33.

As the RAM air proceeds through the inlet 21, the RAM air is directed around a corner 232 at which point the RAM air thermally interacts with the coolant. Subsequently, the RAM air thermally interacts with the first heat exchanger 31, such as a chiller heat exchanger. Once the RAM air passes through the first heat exchanger 31, the RAM air subsequently passes through the second and third heat exchangers 32 and 33, which may be provided as a fresh air heat exchanger and a bleed air heat exchanger, respectively, prior to exiting through the outlet 22.

Figure 2:
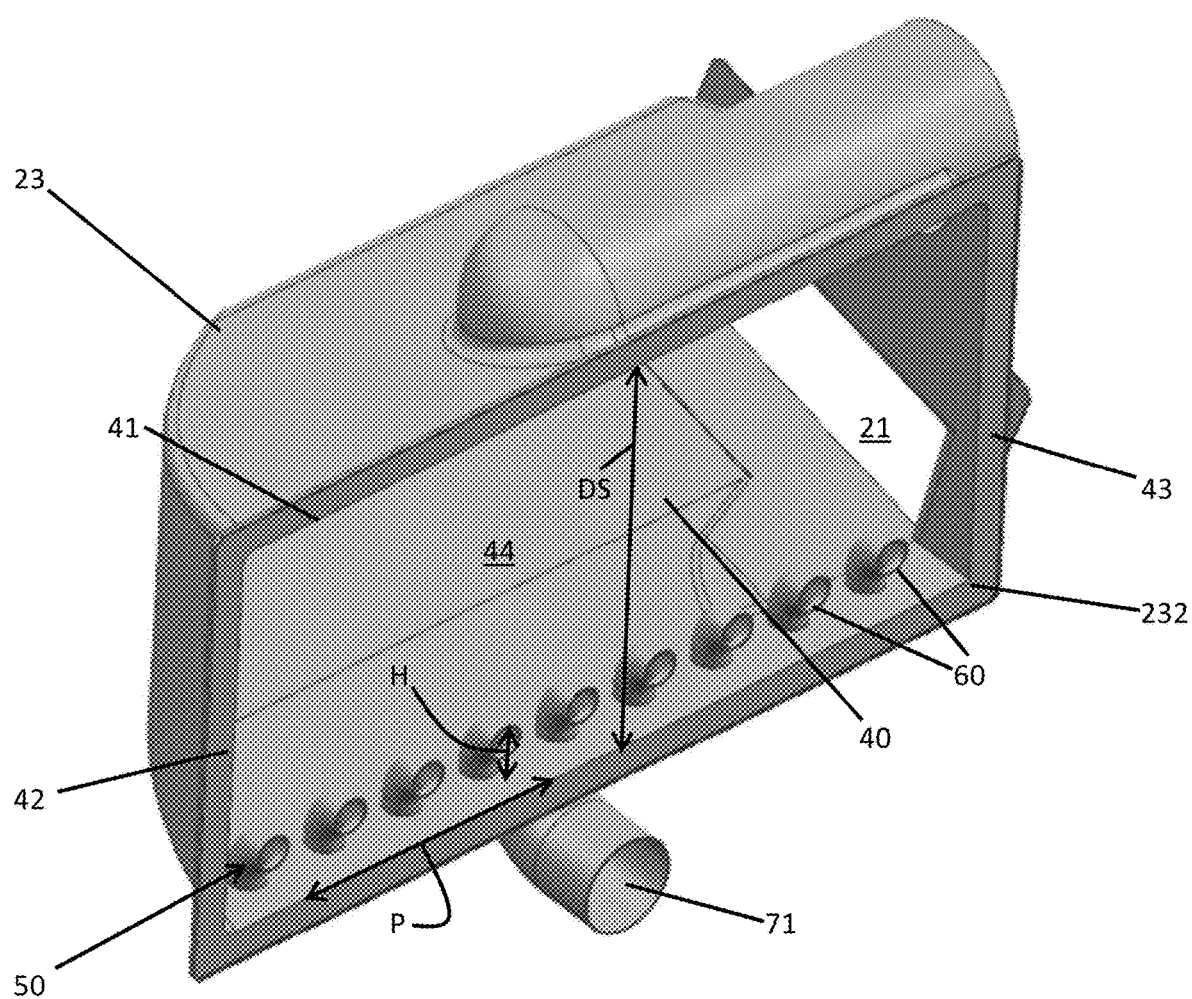
FIG. 2 is a perspective view of nozzles provided in a body of the ECS of FIG. 1 in accordance with embodiments.
Figure 3:
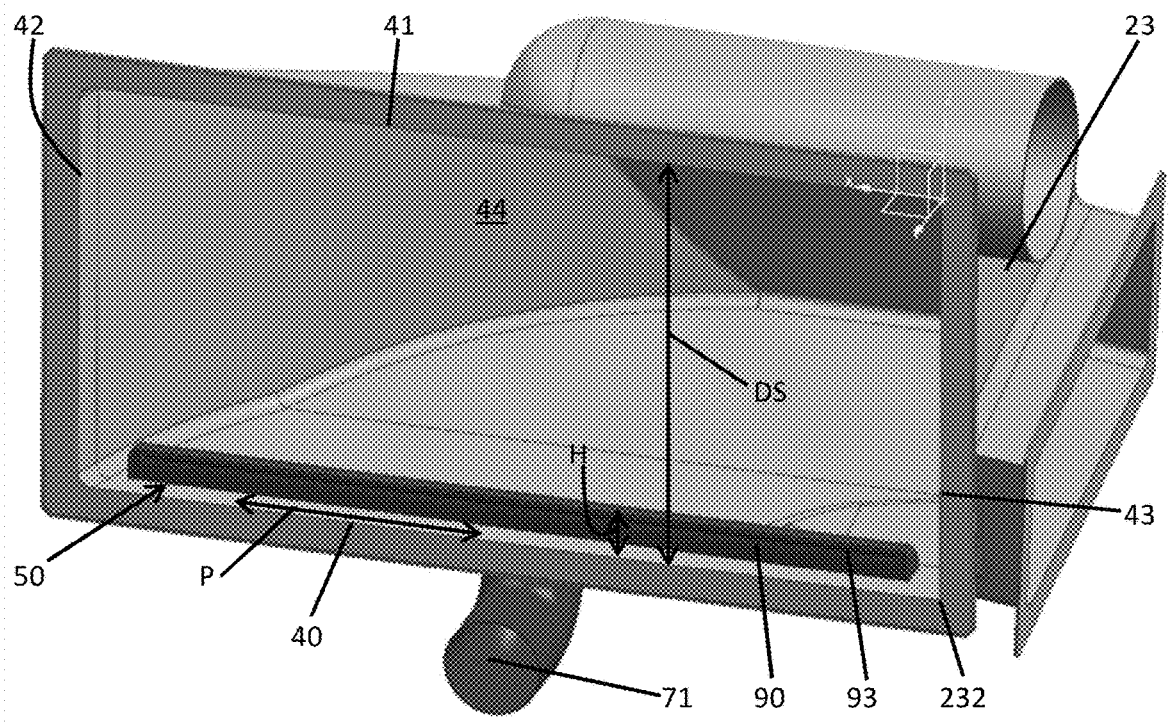
FIG. 3 is a perspective view of a slotted air nozzle provided in a body of the ECS of FIG. 1 in accordance with embodiments.

With reference to FIGS. 2 and 3, the body 23 includes a first body wall 40, a second body wall 41 disposed at a distance from the first body wall 40 and sidewalls 42 and 43. The sidewalls 42 and 43 are disposed at a distance from one another and extend between corresponding edges of the first body wall 40 and the second body wall 41. The first body wall 40, the second body wall 41 and the sidewalls 42 and 43 thus form an interior 44 through which the RAM air passes as the RAM air proceeds toward the first heat exchanger 31. The corner 232 is formed from a curvature of the sidewall 42, which curves along a plane P of the first body wall 40 about an edge of the sidewall 43. At or proximate to the first body wall 40, the corner 232 may be provided as a cold-cold corner of the first heat exchanger 31 as heated air moving through the first heat exchanger 31 is cooled by thermal interaction with the RAM air upon reaching the corner 232 at the first body wall 40. In accordance with embodiments, the cold-cold corner of the first heat exchanger 31 can extend across a span of the first body wall 40.

To an extent that the RAM air may not be sufficiently cool, especially on hot days, the RIH 20 further includes features by which the excess cooled air can be provided from the first and second sources 11 and 12 and thus directed into the flows of the RAM air and toward the first heat exchanger 31. As shown in FIGS. 2 and 3, the features include a nozzle body 50 that is arranged along the first body wall 40 and configured to direct a curtain of cooled air into the flows of the RAM air and toward the first heat exchanger 31. In an exemplary case, the cooled air can be provided at a temperature of around 70° F. or lower and the RAM air can be provided at a temperature of around 90° F. or higher and, in such cases, the presence of the cooled air provides for substantially improved cooling capability at least at the first heat exchanger 31.

Figure 4:
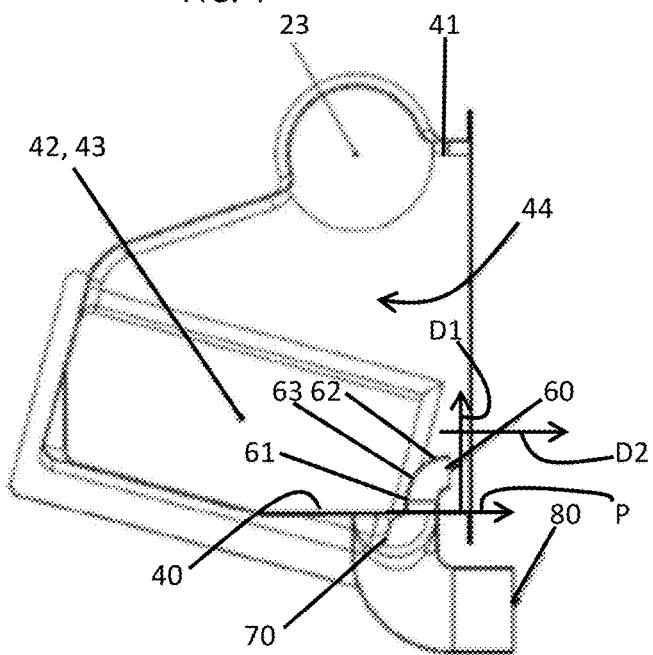
FIG. 4 is a side view of the nozzles of FIG. 2 in accordance with embodiments.
Figure 5:
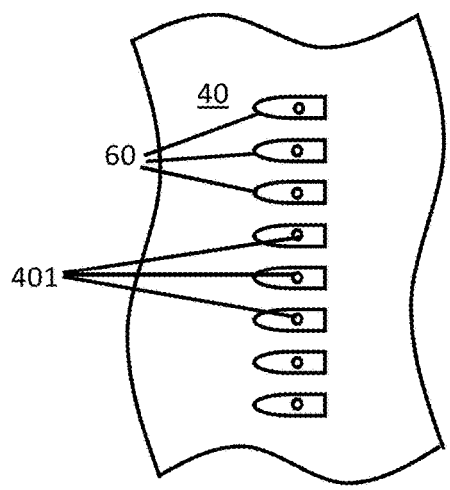
FIG. 5 is an elevation view of the nozzles of FIG. 2 in accordance with embodiments.

With continued reference to FIG. 2 and with additional reference to FIGS. 4 and 5, the nozzle body 50 can be provided as a plurality of nozzles 60 arranged along the first body wall 40 to direct the cooled air into the flows of the RAM air and toward the first heat exchanger 31. As shown in FIGS. 2, 4 and 5, each nozzle 60 is displaced from a neighboring nozzle 60 and includes a first body 61, a second body 62 and a curved body 63. The first body 61 is formed to define a first flowpath and is extendable in a first direction D1 from the first body wall 40. The first direction D1 is transversely oriented relative to the plane P of the first body wall 40 and may be perpendicularly oriented relative to the plane P. The second body 62 is formed to define a second flowpath and is extendable in a second direction D2. The second direction D2 may be transversely oriented relative to the first direction D1 and may be substantially parallel with the plane P. The curved body 63 forms a smooth, low-profile and aerodynamic surface that minimally inhibits the flows of the RAM air. The curved body 63 is fluidly interposed between the first and second bodies 61 and 62 such that the second flowpath is receptive of fluid from the first flowpath. The first body wall 40 is formed to define holes 401 (see FIG. 5) which are respectively communicative with interiors of each of the nozzles 60.

The RIH 20 further includes a manifold 70 and a tubular body 80. The manifold 70 includes a manifold intake 71 (see FIG. 2) and is disposed at an exterior surface of the first body wall 40 at an exterior of the body 23. The manifold 70 is configured to distribute the cooled air to each nozzle 60 via the holes 401. The tubular body 80 is configured to transport the cooled air from the intake 71.

Thus, cooled air provided from the first and second sources 11 and 12 is transported through the first and second passageways 110 and 120 to the tubular body 80, which in turn transports the cooled air to the nozzles 60 via the holes 401. Within the nozzles 60, the cooled air moves through the first flowpaths and then the second flowpaths and is exhausted into the flows of the RAM air and toward the first heat exchanger 31. In accordance with embodiments, the manifold 70 and the nozzles 60 may each be configured such that a predominant flow direction of the cooled air leaving the second body 62 of each nozzle 60 opposes a predominant flow direction of the cooled air in the tubular body 80.

In accordance with embodiments, each of the nozzles 60 may have a substantially uniform shape and size although it is to be understood that some of the nozzles 60 may be differently configured from others or otherwise unique. For example, in some embodiments, the nozzles 60 in a central region of the body 23 maybe larger than the nozzles 60 proximate to the sidewalls 42 and 43. As a general matter, the nozzles 60 are respectively sized and shaped to provide the curtain of the cooled air as a substantially uniform curtain along the first body wall 40.

In accordance with embodiments, the plurality of nozzles 60 may be arranged in a linear formation with substantially uniform spacing between neighboring nozzles 60 along the first body wall 40 although it is to be understood that some of the nozzles 60 may be arranged differently. For example, in some embodiments, the nozzles 60 may be concentrated more in a central region of the body 23 than the nozzles 60 proximate to the sidewalls 42 and 43. As a general matter, the nozzles 60 are respectively arranged to provide the curtain of the cooled air as a substantially uniform curtain along the first body wall 40.

In accordance with embodiments, a height H of each of the nozzles 60 may be substantially less than a distance DS between the first body wall 40 and the second body wall 41 (see FIG. 2). In this way, the curtain of cooled air is provided at or proximate to the first body wall 40. However, in accordance with embodiments, the height H of each of the nozzles 60 as measured from the first body wall 40 may be variable (the variability of the height H may be provided by electro-magnetic, hydraulic or pneumatic mechanisms as will be described below). Thus, it is possible that the plurality of the nozzles 60 can be configured as a whole to provide the curtain of cooled air with varying characteristics. For example, the nozzles 60 in a central region of the body 23 can have different heights H as compared to the nozzles 60 proximate to the sidewalls 42 and 43 such that the curtain of cooled air is has a convex or concave shape.

Figure 6A:
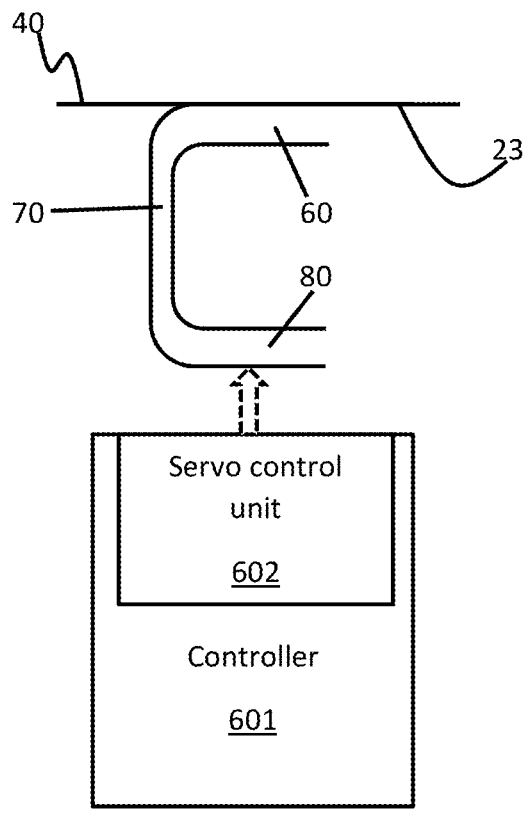
FIG. 6A is a side view of an electro-magnetic or hydraulic control of the nozzles of FIGS. 2, 4 and 5.
Figure 6B:
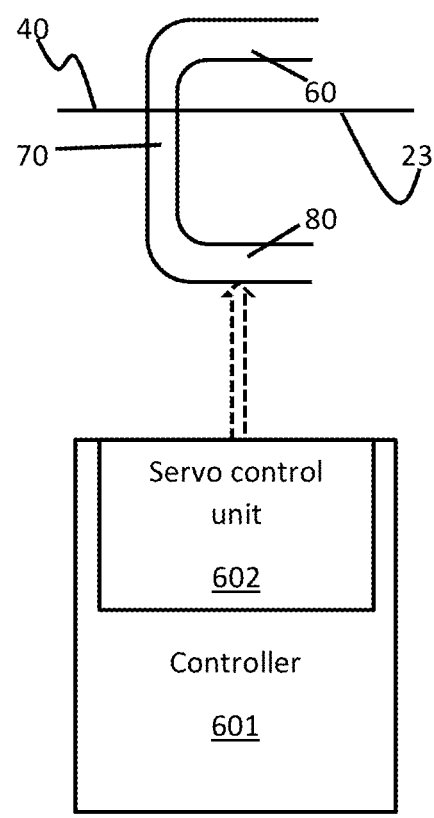
FIG. 6B is a side view of the electro-magnetic or hydraulic control of the nozzles of FIGS. 2, 4 and 5.
Figure 7A:
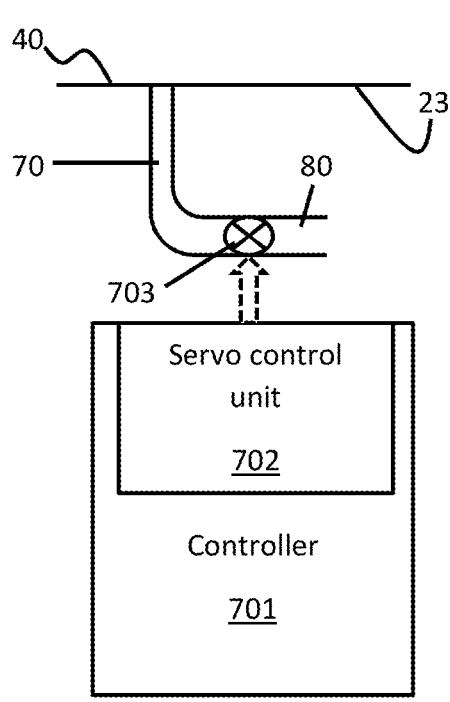
FIG. 7A is a side view of a hydraulic or pneumatic control of the nozzles of FIGS. 2, 4 and 5.
Figure 7B:
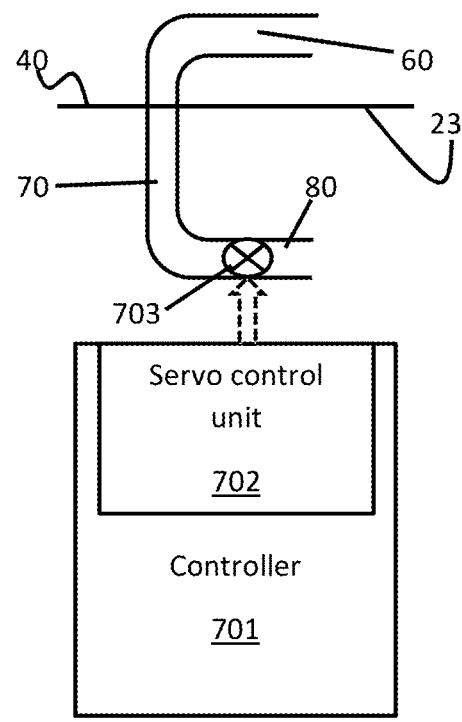
FIG. 7B is a side view of the hydraulic or pneumatic control of the nozzles of FIGS. 2, 4 and 5.

With reference to FIGS. 6A and 6B and to FIGS. 7A and 7B, each nozzle 60 may be independently or dependently extendable or retractable electro-magnetically, hydraulically or pneumatically.

For the electro-magnetic and hydraulic extension and retraction, as shown in FIGS. 6A and 6B, a controller 601 may be provided with a servo control unit 602 that is coupled to one or more of the nozzles 60. The controller 601 determines when the cooled air from the sources 11 and 12 should be provided into the flows of the RAM air and toward the first heat exchanger 31 (i.e., when the cooled air is colder than the RAM air) and accordingly instructs the servo control unit 602 as to when to activate the one or more of the nozzles 60. Upon receiving such instruction, the servo control unit 602 engages to move the one or more of the nozzles 60 from stowed positions (see FIG. 6A) at an exterior of the body 23 to active positions within the body 23 (see FIG. 6B).

For the hydraulic and pneumatic extension and retraction, as shown in FIGS. 7A and 7B, a controller 701 may be provided with a servo control unit 702 that is coupled to a valve 703 in the tubular body 80. The controller 701 determines when the cooled air from the sources 11 and 12 should be provided into the flows of the RAM air and toward the first heat exchanger 31 (i.e., when the cooled air is colder than the RAM air) and accordingly instructs the servo control unit 702 as to when to open the valve 703. Upon receiving such instruction, the servo control unit 702 engages to open the valve 703 which results in the nozzles 60 inflating from uninflated conditions (see FIG. 7A) to inflated conditions (see FIG. 7B).

Figure 8:
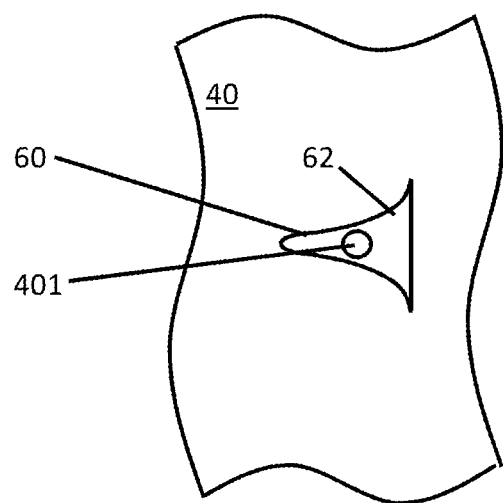
FIG. 8 is a top-down view of a single nozzle in accordance with embodiments.

With reference to FIG. 8 and, in accordance with further embodiments, while the nozzles 60 are illustrated in FIG. 2 and FIGS. 4-7B as being provided as a plurality of nozzles 60, it is to be understood that the nozzles 60 may be provided as one or more nozzles 60. For example, as shown in FIG. 8, a single nozzle 60 may be provided in a central region of the body 23. This single nozzle 60 may be configured to provide for the formation of the curtain of cooled air by an outward tapering of at least the second body 62.

Figure 9:
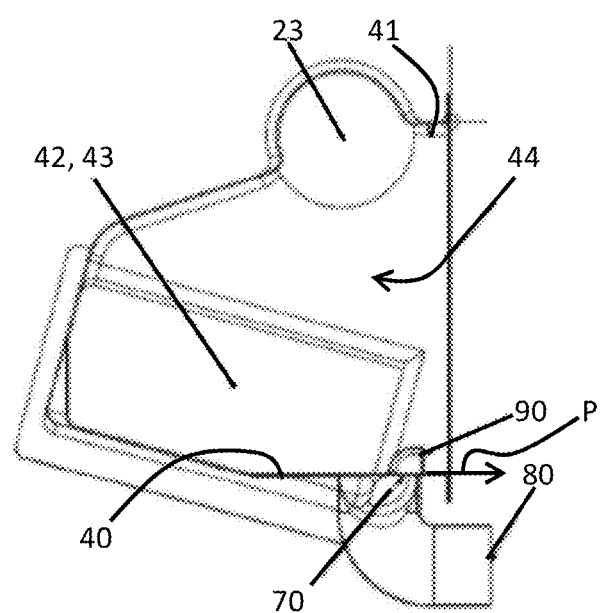
FIG. 9 is a side view of the slotted air nozzle of FIG. 3 in accordance with embodiments.
Figure 10:
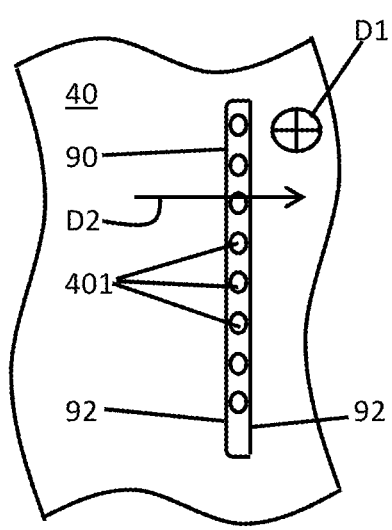
FIG. 10 is an elevation view of the slotted air nozzle of FIG. 3 in accordance with embodiments.

With reference back to FIG. 3 and with additional reference to FIGS. 9 and 10, the nozzle body 50 can be provided as a slotted air nozzle 90 disposed along the first body wall 40 to direct the cooled air into the flows of the RAM air and toward the first heat exchanger 31. As shown in FIGS. 3, 9 and 10, the slotted air nozzle 90 includes a first nozzle wall 91 and a second nozzle wall 92 (see FIG. 10). The first nozzle wall 91 is extendable in a first direction D1 (see FIG. 10) from the first body wall 40. The first direction D1 is transversely oriented relative to the plane P of the first body wall 40 and may be perpendicularly oriented relative to the plane P. The first nozzle wall 91 is formed to define a slot 93 (see FIG. 3). The slot 93 extends above and along the plane P of the first body wall 40 along substantially an entire length of the slotted air nozzle 90 (i.e., the slot 93 may be slightly shorter than the first and second nozzle walls 91 and 92). The second nozzle wall 92 is displaced, at the plane P of the first body wall 40, aft from the first nozzle wall 91 relative to a predominant direction of the RAM air flows through the body 23. The second nozzle wall 92 is curvilinearly extendable from the first body wall 40 toward a distal edge of the first nozzle wall 91 so as to form a smooth, low-profile and aerodynamic surface that minimally inhibits the flows of the RAM air. The first body wall 40 is formed to define holes 401 (see FIG. 10) which are respectively communicative with an interior of the slotted air nozzle 90.

As noted above, the RIH 20 further includes the manifold 70 and the tubular body 80. The manifold 70 includes the manifold intake 71 (see FIG. 3) and is disposed at the exterior surface of the first body wall 40 at the exterior of the body 23. The manifold 70 is configured to distribute the cooled air to the slotted air nozzle 90 via the holes 401. The tubular body 80 is configured to transport the cooled air to the intake 71.

Thus, the cooled air provided from the first and second sources 11 and 12 is transported through the first and second passageways 110 and 120 to the tubular body 80, which in turn transports the cooled air to the slotted air nozzle 90 via the holes 401. Within the slotted air nozzle 90, the cooled air moves between the first and second nozzle walls 91 and 92 and is exhausted into the flows of the RAM air and toward the first heat exchanger 31 via the slot 93. In accordance with embodiments, the manifold 70 and the slotted air nozzle 90 may each be configured such that a predominant flow direction of the cooled air flowing through the slot 93 opposes a predominant flow direction of the cooled air in the tubular body 80.

In accordance with embodiments, the slotted air nozzle 90 may have a substantially uniform linear shape that extends along the first body wall 40 although it is to be understood that alternate configurations are possible. For example, in some embodiments, the slotted air nozzle 90 may be curved forwardly or aft from a central region of the body 23 toward the sidewalls 42 and 43. As a general matter, the slotted air nozzle 90 is sized and shaped to provide the curtain of the cooled air as a substantially uniform curtain along the first body wall 40.

In accordance with embodiments, a height H of the slotted air nozzle 90 may be substantially less than the distance DS between the first body wall 40 and the second body wall 41 (see FIG. 3). In this way, the curtain of cooled air is provided at or proximate to the first body wall 40. However, in accordance with embodiments, the height H of the slotted air nozzle 90 may be variable as a whole or along its length (the variability of the height H may be provided by electro-magnetic, hydraulic or pneumatic mechanisms as will be described below). Thus, it is possible that the slotted air nozzle 90 can be configured as a whole to provide the curtain of cooled air with varying characteristics. For example, portion of the slotted air nozzle 90 in the central region of the body 23 can have a different height H as compared to the portions of the slotted air nozzle 90 proximate to the sidewalls 42 and 43 such that the curtain of cooled air is has a convex or concave shape.

With reference to FIGS. 11A and 11B and to FIGS. 12A and 12B, the slotted air nozzle 90 may be extendable or retractable electro-magnetically, hydraulically or pneumatically.

For the electro-magnetic and hydraulic extension and retraction, as shown in FIGS. 11A and 11B, a controller 1101 may be provided with a servo control unit 1102 coupled to the slotted air nozzle 90. The controller 1101 determines when the cooled air from the sources 11 and 12 should be provided into the flows of the RAM air and toward the first heat exchanger 31 (i.e., when the cooled air is colder than the RAM air) and accordingly instructs the servo control unit 1102 as to when to activate the slotted air nozzle 90. Upon receiving such instruction, the servo control unit 1102 engages to move the slotted air nozzle 90 from the stowed position (see FIG. 11A) at an exterior of the body 23 to an active position within the body 23 (see FIG. 11B).

For the hydraulic and pneumatic extension and retraction, as shown in FIGS. 12A and 12B, a controller 1201 may be provided with a servo control unit 1202 that is coupled to a valve 1203 in the tubular body 80. The controller 1201 determines when the cooled air from the sources 11 and 12 should be provided into the flows of the RAM air and toward the first heat exchanger 31 (i.e., when the cooled air is colder than the RAM air) and accordingly instructs the servo control unit 1202 as to when to open the valve 1203. Upon receiving such instruction, the servo control unit 1202 engages to open the valve 1203 which results in the slotted air nozzle 90 inflating from an uninflated condition (see FIG. 12A) to an inflated condition (see FIG. 12B).

Figure 13:
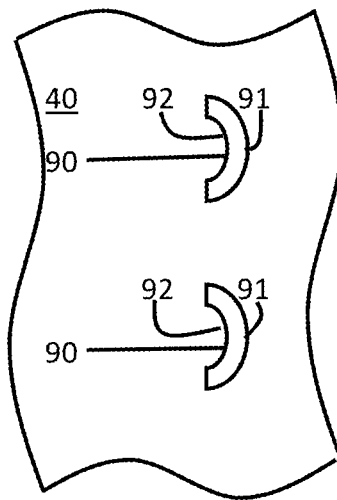
FIG. 13 is a top-down view of two slotted air nozzles in accordance with embodiments.

With reference to FIG. 13 and, in accordance with further embodiments, while the slotted air nozzle 90 is illustrated in FIG. 3 and FIGS. 8-12B as being provided as a singular element, it is to be understood that one or more slotted air nozzles 90 may be provided. For example, as shown in FIG. 13, two slotted air nozzles 90 may be provided at opposite sides of the body 23. The two slotted air nozzles 90 may be respectively configured to cooperatively provide for the formation of the curtain of cooled air by being similarly curved along the first body wall 40.

While the various embodiments described herein are generally described separately, it is to be understood that they may be combined in various combinations and permutations. For example, one or more of the nozzles 60 may be combined with the slotted air nozzle 90 to provide for the formation of the curtain of cooled air. In addition, each of the nozzles 60 and the slotted air nozzle 90 can be formed of metallic, molded or composite (e.g., carbon-fiber) materials. In particular, in the cases of the nozzles 60 and the slotted air nozzle 90 being inflatable as shown in FIGS. 7A and 7B and in FIGS. 12A and 12B, the nozzles 60 and the slotted air nozzle 90 may be formed of elastomeric and/or compliant materials (e.g., rubber).

Figure 14:
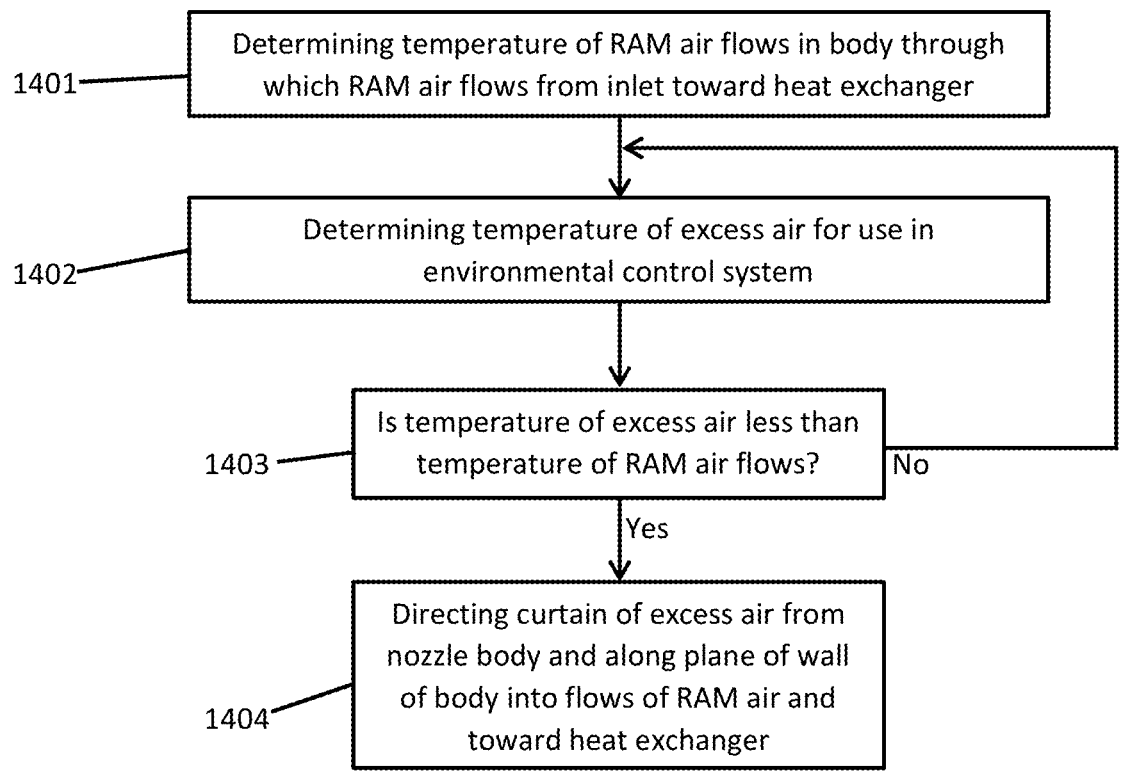
FIG. 14 is a flow diagram illustrating a method of operating a RAM air inlet (RIH) in accordance with embodiments.

With reference to FIG. 14, a method of operating an RIH as described above is provided and includes determining a temperature of RAM air flows in a body through which RAM air flows from an inlet toward a heat exchanger (1401) and determining a temperature of excess air for use in an environmental control system (ECS) (1402). In an event the temperature of the excess air is less than the temperature of the RAM air flows (1403), the method further includes directing a curtain of the excess air from a nozzle body, which is disposed proximate to a cold-cold corner of the heat exchanger, and along a plane of a wall of the body into flows of the RAM air and toward the heat exchanger (1404). The method may further include electro-magnetically, hydraulically or pneumatically extending the nozzle body in the event the temperature of the excess air is less than the temperature of the RAM air flows and electro-magnetically, hydraulically or pneumatically retracting the nozzle body in the event the temperature of the excess air is greater than the temperature of the RAM air flows.

Technical effects and benefits of the disclosure are the efficient direction of excess turbine cooling air towards the cold-cold corner of the RAM heat exchanger using lightweight elements without obstructing other flows or causing excessive pressure drops.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A RAM inlet header (RIH), comprising:
a body through which RAM air flows from an inlet toward a heat exchanger;
a nozzle body arranged along a wall of the body to be extendable into and retractable from an interior of the body,
the nozzle body being configured to exclusively form a curtain of cooled air along and at the wall when extended into the interior and to thereby direct the curtain of cooled air into flows of the RAM air and toward the heat exchanger.

2. The RIH according to claim 1, wherein the body is curved.

3. The RIH according to claim 1, wherein the nozzle body comprises at least one of metallic, molded and composite materials.

4. The RIH according to claim 1, wherein the nozzle body is hydraulically or pneumatically inflatable and deflatable in the interior of the body.

5. A RAM inlet header (RIH), comprising:
a body through which RAM air flows from an inlet toward a heat exchanger;
a plurality of nozzles arranged along a wall of the body to respectively form a curtain of cooled air along the wall and to thereby respectively direct the curtain of cooled air into flows of the RAM air and toward the heat exchanger;
each nozzle being displaced from a neighboring nozzle and comprising:
a first body, which is formed to define a first flowpath and which is extendable in a first direction from the wall of the body;
a second body, which is formed to define a second flowpath and which is extendable in a second direction along a plane of the wall of the body; and
a curved body interposed between the first and second bodies and by which the second flowpath is receptive of fluid from the first flowpath,
wherein each of the nozzles is hydraulically or pneumatically inflatable or deflatable in an interior of the body.

6. The RIH according to claim 5, wherein the body is curved, the wall is formed to define holes and the RIH further comprises:
a manifold disposed at an exterior of the body and configured to distribute the cooled air to each nozzle via the holes; and
a tubular body to transport the cooled air to an intake of the manifold.

7. The RIH according to claim 6, wherein a predominant flow direction of the cooled air leaving the second body of each nozzle opposes a predominant flow direction of the cooled air in the tubular body.

8. The RIH according to claim 5, wherein each of the nozzles has a substantially uniform shape and size.

9. The RIH according to claim 5, wherein the plurality of nozzles is arranged in a linear formation with substantially uniform spacing along the wall.

10. The RIH according to claim 5, wherein a height of each of the nozzles is substantially less than a distance between the wall and an opposite wall of the body.

11. The RIH according to claim 5, wherein a height of each of the nozzles as measured from the wall is variable.

12. The RIH according to claim 5, wherein each nozzle is configured to respectively form the curtain of cooled air along the wall when extended into the interior of the body and to thereby respectively direct the curtain of cooled air into flows of the RAM air and toward the heat exchanger.

13. A RAM inlet header (RIH), comprising:
a body through which RAM air flows from an inlet toward a heat exchanger;
one or more nozzles arranged along a wall of the body to respectively form a curtain of cooled air along the wall and to thereby respectively direct the curtain of cooled air into flows of the RAM air and toward the heat exchanger;
the one or more nozzles being displaced from one or more neighboring nozzles and respectively comprising:
a first body, which is formed to define a first flowpath and which is extendable in a first direction from the wall of the body;
a second body, which is formed to define a second flowpath and which is extendable in a second direction along a plane of the wall of the body; and
a curved body interposed between the first and second bodies and by which the second flowpath is receptive of fluid from the first flowpath,
wherein each of the one or more nozzles is hydraulically or pneumatically inflatable or deflatable in an interior of the body.

14. The RIH according to claim 13, wherein the body is curved, the wall is formed to define one or more holes and the RIH further comprises:
a manifold disposed at an exterior of the body and configured to distribute the cooled air to each of the one or more nozzles via the one or more holes; and
a tubular body to transport the cooled air to an intake of the manifold.

15. The RIH according to claim 14, wherein a predominant flow direction of the cooled air leaving the second body of each of the one or more nozzles opposes a predominant flow direction of the cooled air in the tubular body.

16. The RIH according to claim 13, wherein a height of each of the one or more nozzles is substantially less than a distance between the wall and an opposite wall of the body.

17. The RIH according to claim 13, wherein a height of each of the one or more nozzles as measured from the wall is variable.

18. The RIH according to claim 13, wherein each nozzle is configured to respectively form the curtain of cooled air along the wall when extended into the interior of the body and to thereby respectively direct the curtain of cooled air into flows of the RAM air and toward the heat exchanger.

* * * * *